UNITED STATES PATENT OFFICE.

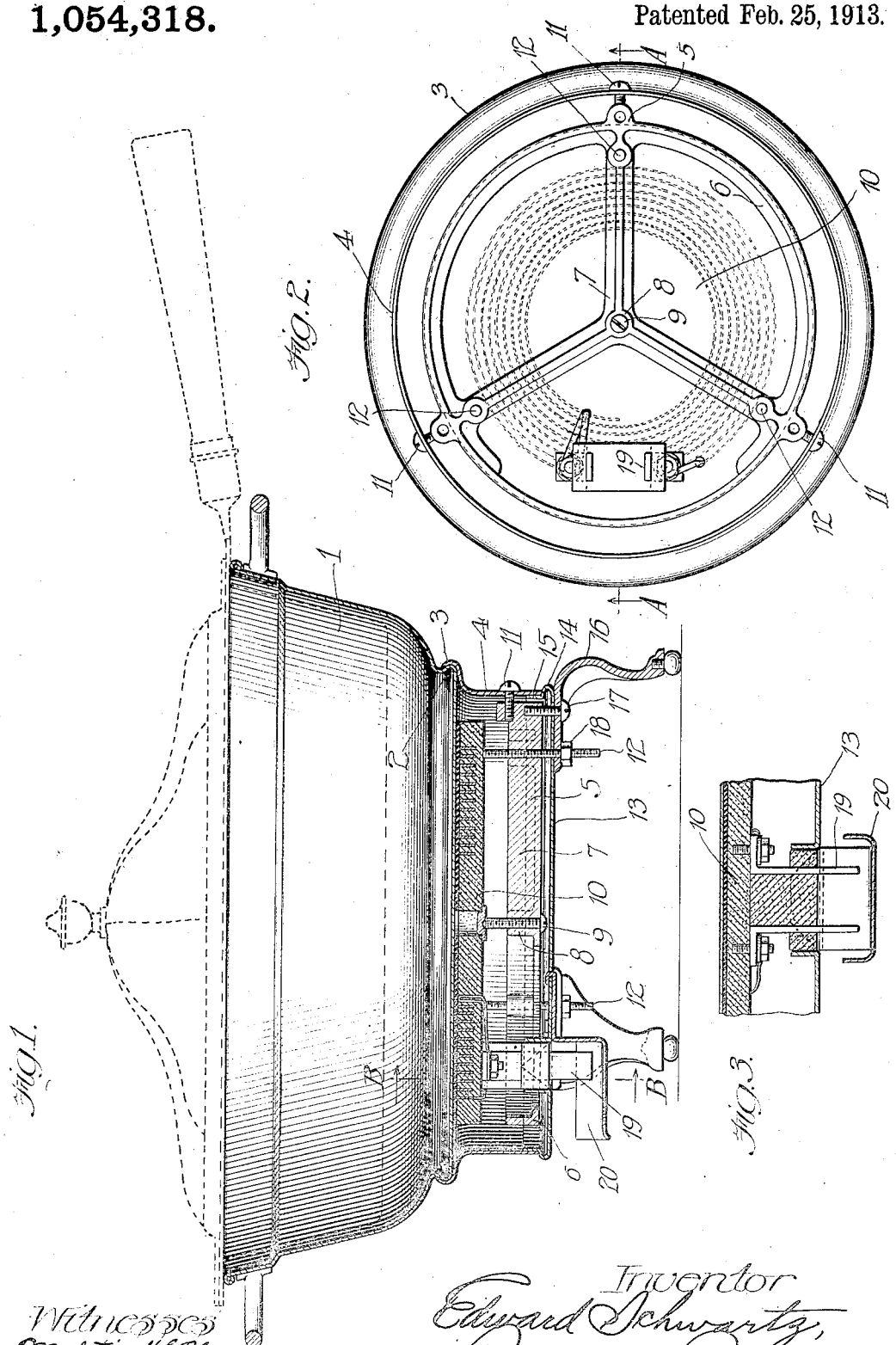

EDWARD SCHWARTZ, OF CHICAGO, ILLINOIS, ASSIGNOR TO PELOUZE MANUFACTURING CO., OF CHICAGO, ILLINOIS.

ELECTRICALLY-HEATED LIQUID-RECEPTACLE.

1,054,318.   Specification of Letters Patent.   Patented Feb. 25, 1913.

Application filed February 24, 1912. Serial No. 679,550.

*To all whom it may concern:*

Be it known that I, EDWARD SCHWARTZ, a citizen of the United States of America, and a resident of Chicago, county of Cook, State of Illinois, have invented certain new and useful Improvements in Electrically-Heated Liquid-Receptacles, of which the following is a specification.

The main objects of this invention are to provide an improved construction for electrically heated devices whereby a higher efficiency and more compact structure may be obtained than is possible with usual constructions; to provide a construction which is particularly suitable for use in connection with electrically heated chafing dishes, and related devices in which the heat is applied to a plane surface and thereby transmitted to a liquid; to provide an improved construction whereby the heat transmitting surface of the dish may be brought into contact with a heating element without the use of rivets, bolts or similar means directly connecting them; to provide improved means for urging an electric heating element into contact with the bottom wall of the dish; and to provide an improved method of attaching the heater casing to the dish.

An illustrative embodiment of this invention as applied to a chafing dish is shown in the accompanying drawings, in which:—

Figure 1 is a section taken on the line A—A of Fig. 2. Fig. 2 is a bottom plan of the heating element, with its casing being removed. Fig. 3 is a sectional detail of the conductor terminals of the heating element, the section being taken on the line B—B of Fig. 1.

In the construction shown in the drawings, the dish 1, which during operation usually contains a quantity of boiling water, and by means of which the heat is transmitted to the pan (shown in dotted lines), is a shallow circular receptacle having an annular shoulder 2 at the edge of its bottom wall. Depending from the dish 1 and having spun connection therewith at 3, in substantial conformity with the annular shoulder 2, is a rim or flange 4 by means of which the dish 1 is firmly and securely supported in its elevated position and which also has supported thereon by means of the threaded bolts 11 a truss or backing frame 5.

The truss 5 comprises an annular rim 6 and ribs 7 and is tapped at 8 to receive the threaded screw bolt 9 by means of which the electric heating element 10 is supported and adjusted. The studs or bolts 12 have threaded engagement with the truss 5 and have their upper ends bearing on the bottom surface of the heating element 10 and are adapted to be turned to force the heating element away from the truss 5 and urge it into contact with the bottom wall of the dish 1.

A closure 13 having an annular shoulder 14 and an upwardly extending flange 15, is adapted to fit within the lower edge of the flange 4 and is held in position by the nuts 18 which are threaded on the lower end of the studs 12 which extend downwardly through the closure. The closure 13, the bottom wall of the dish 1, and the depending flange 4 form the casing for the heating element 10 and the truss 5.

The legs 16 are secured by bolts 17 which extend through the closure 13 and are tapped into the truss 5. These bolts 17, together with the studs 12, rigidly secure the legs 16 in fixed position with respect to the truss. The terminals of the electric heater 10 are connected to a pair of switch terminals 19 which project below the bottom of the casing and are suitably insulated therefrom. A shield or cover 20 is supported on the closure 13 and extends over the switch terminals 19.

The operation of this device is similar to that of other devices of this character and therefore will be readily understood from the foregoing description.

Although but one specific embodiment of this invention has been herein shown and described, it will be understood that numerous details of the construction shown may be altered or omitted without departing from the spirit of this invention as defined by the following claims.

I claim:—

1. An electric heating device, comprising a dish having an annular flange depending therefrom, an electric heating element, a backing frame mounted on said flange, and adjustable means bearing between said backing frame and heating element adapted to force them apart and thereby urge said heating element into contact with the bottom of said dish.

2. An electric heating device, comprising a dish having an annular depending flange, an electric heating element, a rigid backing frame below said heating element supported on said flange, said heating element and backing frame fitting within said depending flange, a closure, studs carried by said frame and bearing on said heating element and adapted to force them apart and to urge said electric heater into contact with the bottom wall of said dish, said studs extending through said closure and carrying at their lower ends means for securing said closure in position.

3. An electric heating device, comprising a dish having an annular depending flange, an electric heating element, a rigid backing frame below said heating element, said frame comprising a rim and ribs extending across the space within said rim, a closure, and means carried by said frame and bearing on said heating element to force them apart and to urge said heating element into contact with said dish.

4. An electric heating device, comprising a dish, a circular electric heating element, and a rigid backing frame connected to said dish, said frame comprising an annular rim with radiating spider arms subtending it, a series of screws bearing between said frame and said heating element, and an annular series of screws bearing between said frame and said heater adjacent to the edges thereof.

Signed at Chicago this 16th day of February 1912.

EDWARD SCHWARTZ.

Witnesses:
A. B. HATCH,
KATHERINE M. HEALY.

---

Correction in Letters Patent No. 1,054,318.

It is hereby certified that in Letters Patent No. 1,054,318, granted February 25, 1913, upon the application of Edward Schwartz, of Chicago, Illinois, for an improvement in "Electrically-Heated Liquid-Receptacles," an error appears in the printed specification requiring correction as follows: Page 2, line 28, for the words "series of screws" read *central screw;* and that the said Letters Patent should be read with this correction therein that the same may conform to the record of the case in the Patent Office.

Signed and sealed this 1st day of April, A. D., 1913.

[SEAL.]

C. C. BILLINGS,
*Acting Commissioner of Patents.*